Figure 1:
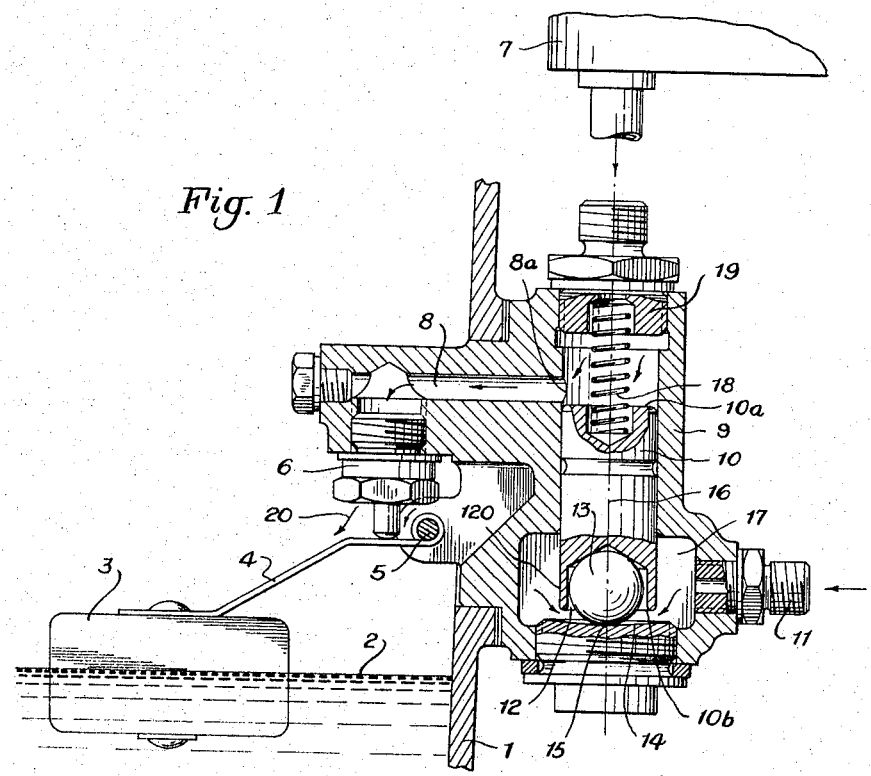

Aug. 15, 1967  J. LIEBEL ET AL  3,335,736
AUTOMATIC DEVICE FOR ADDING MAKEUP OIL TO AN ENGINE
Filed June 7, 1965

INVENTORS
Julius Liebel
Karl Fleischmann
Karl Ruppert
BY Bailey, Stephens and Huettig
ATTORNEYS

United States Patent Office 3,335,736
Patented Aug. 15, 1967

3,335,736
AUTOMATIC DEVICE FOR ADDING MAKEUP OIL TO AN ENGINE
Julius Liebel and Karl Fleischmann, Nurnberg, and Karl Ruppert, Furth, Germany, assignors to Maschinenfabrik Augsburg-Nurnberg Aktiengesellschaft, Nurnberg, Germany
Filed June 7, 1965, Ser. No. 461,998
Claims priority, application Germany, June 10, 1964, M 61,311
2 Claims. (Cl. 137—39)

This invention relates to an apparatus for automatically adding makeup or refill fresh oil from a reservoir to the oil sump or pan of an internal combustion engine having a closed circuit lubricating oil system. It is applicable to internal combustion engines for motor vehicles of all types, and relies on a float control system embodying a valve or similar device which responds to oil level fluctuations in the oil pan for the opening or closing of the fresh oil feed to the oil pan. In this invention, the float control system has attached to it an automatic refill interlock device which operates automatically when the tilt angle of the internal combustion engine exceeds a given value to shut off the oil supply, and which is also responsive to the operating condition of the internal combustion engine or equipment associated with its operation.

For example, the valve of the oil refill interlock device may be responsive to fluctuations in the oil pressure in the lubricating oil circulating system. Alternatively, this valve may be arranged to be actuated in response to voltage fluctuations in the generator circuit; in other words, in response to variables which indirectly are all typical of the operating condition of the engine. The important thing is that the float control system employed for such applications will always maintain the oil level in the oil pan within a given range which normally is in the middle between the specified maximum and minimum oil levels for the respective engine. For this purpose it is important to provide for the fact that, when the vehicle and consequently its engine is at an appreciable angle of tilt, a float controlled oil level refilling system will no longer correctly indicate the oil quantity actually contained in the oil pan, and therefore monitoring of the oil level under these conditions will be inaccurate or even be ought erroneous so that the amount of fresh oil admitted under these conditions would not correspond to the actual loss of oil due to the running of the engine.

The object of this invention is to create, by simple means, an automatically working oil refill interlock device to permit oil replenishing only when the prime mover of the vehicle is in a level position or at an angle of tilt not exceeding a permissible value, and to shut off the fresh oil supply when the given angle of tilt of the engine is exceeded. Moreover, means are provided for preventing admission of fresh oil except when the engine is stopped because, with the engine running or with the lubricating oil circulating, which starts automatically as soon as the engine runs, the oil level in the oil pan tends to fluctuate a great deal and the float will be incapable of providing an accurate reference value for the volume of oil in the oil pan.

According to the present invention, the valve of the oil refill interlock device includes a rolling body, such as a ball, to control the valve motion in the opening direction. This ball rests on a concave surface upon which the ball is free to move, but which surface is shaped so that within an acceptable angle of tilt of the vehicle from level position which will not affect correct indications of the oil level, the ball remains at the center of this surface. Where the rolling body is a ball, the seating surface may be conical or slightly spherical and with its center depressed below its periphery. The depressed center is exactly below the center of the valve piston which in turn is formed with a pocket on the end facing the ball and into which the ball will enter when the vehicle is in a level position and with the ball then being in the center of the seating surface. The ball is of a diameter smaller than the pocket. This permits the necessary maximum opening motion of the piston to admit fresh oil. Conversely, when the vehicle is leaning at an excessive angle of tilt, the ball will move out of the center of its seat and roll towards the periphery of the seating surface. In this direction, however, the freedom of movement of the ball is limited so that it stops with the center of the ball being directly underneath the skirt of the piston pocket. As a result, the valve piston cannot descend downwards over the ball with the vehicle in this position, but will come to rest on the ball and fresh oil admittance to the float valve will not occur.

The use of a ball ensures very positive interlocking action because even with a relatively small angle of tilt of the internal combustion engine it will move out or in depending on the cone angle of the seating surface. In addition, it is desirable that the seat area for the ball should be of a rotational symmetrical shape because in that case the ball will monitor all angular positions of the vehicle over 360° of the seating area.

Figure 2:
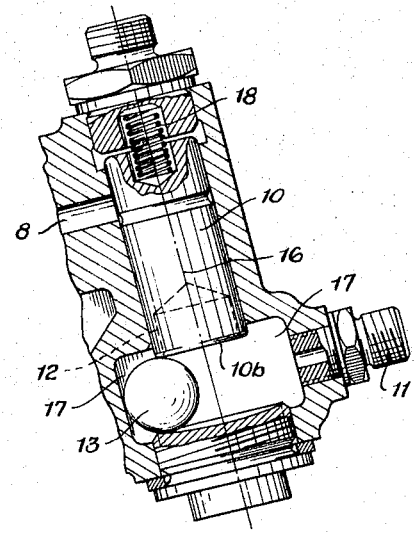

The means by which the objects of the invention are obtained are describes more fully with reference to the accompanying drawings in which:

FIGURE 1 is a vertical cross-sectional view through the automatic oil device of this invention as applied to the oil pan of an engine; and FIGURE 2 is a similar view of a portion of FIGURE 1 with the device tilted from the vertical.

The float controlled refill system is fitted to the partially shown oil pan 1 of an internal combustion engine filled with oil to the level 2, and having a forced lubricating oil circulating system. The refill system is composed of a float 3 which is attached to a lever 4 having its end 5 pivotally connected to a suitable part of the oil pan or the engine crankcase. The lever 5 operates a float controlled needle valve 6 which admits or shuts off fresh oil from the reservoir 7 through the passage 8.

The oil refill interlock device of this invention consists of a cylinder 9 attached to the oil pan by any suitable means, as by bolting, in which a valve piston 10 is slidably mounted. With its one end 10a the valve piston controls the admission of fresh oil from the reservoir 7 into the passageway 8 through port 8a, whereas its other end 10b is exposed to the pressure of the forced lubricating oil circulating system for the engine through pipe 11, which system is tapped for this purpose. The end 10b of the valve piston 10 is provided with a pocket 12 for a ball 13 which is free to roll in all directions on a conically shaped seating surface 14 depending on the angle of tilt of the engine. The center 15 of the seating surface is deeper than its periphery. Moreover, this center is aligned with the longitudinal axis 16 of the valve piston 10.

The lower portion of cylinder 9 is enlarged into a chamber 17 surrounding the pocket end 10b of piston 10 and in communication with pipe 11. A compression spring 18 extends between piston end 10a and a plug 19 inserted in the upper end of cylinder 9 for urging piston 10 downwardly.

In operation, as shown, the control device is vertical while the engine is shut off and there is practically no oil pressure in the chamber 17 because, with the engine shut down, the oil delivery pump for the lubricating oil circulating system is stopped. The valve piston 10, partially under the action of its own weight and partially under the additional action of compression spring 18, has been moved into its opening position to clear the port 8a. This has been made possible by the fact that in the vertical position of the oil refill interlock device the ball 13 has rolled to the center 15 of the conical seat 14 allowing the pocket 12 to descend over and around the ball. Now fresh oil can flow from the reservoir 7 through the passage 8 and, if the float-controlled needle valve 6 is in its open position at this moment as indicated by the flow arrows 20, the oil runs into the oil pan 1 until the oil level 2 has reached a level where the float controlled needle valve 6 is closed again by the rising float 3. Should in the course of the refilling operation the engine be started and an oil pressure built up in the lubricating oil circuit communicating with the chamber 17, then the valve piston 10 instantaneously lifts to close port 8a. In this manner, the admittance of fresh oil into the oil pan is automatically shut off with the engine running.

If the engine is in the tilted position shown in FIGURE 2 when replenishing is not desired, the oil pressure in chamber 17 lifts piston 10 so that the ball 13 will roll out to the periphery of its seating surface. The rolling surface for the ball 13 need not be conical and may have any other dished shape, for instance a spherical shape provided that it meets the condition that fresh oil supply will be released only with the engine vertical, and shut off whenever the engine is in a tilting position exceeding a given angle. In the position shown in FIGURE 2, the ball has rolled out to be underneath the lower edge of the valve piston 10. The valve is thereby prevented from moving down over and around the ball with the vehicle in this position, and said edge will rest approximately above the center of the ball so that the fresh oil supply to oil pan 1 is shut off.

Having now described the means by which the objects of the invention are obtained, we claim:

1. In combination with a float operated valve for supplying makeup oil from a reservoir to the oil pan of an internal combustion engine having a forced oil lubricating system, automatic means for preventing the flow of oil through said float valve when the engine is tilted from the vertical more than a given number of degrees comprising a valve cylinder positioned in the passageway between said float valve and said reservoir, a piston movably in said cylinder for opening and closing said passageway, means for urging said piston in valve open position, pipe means joined to said forced oil lubricating system for urging said piston to valve closed position, and rolling body means in said cylinder beneath said piston for being displaced, when said engine is tilted more than a given number of degrees, to a position where the piston is held in valve closed position and thus preventing the flow of oil from the reservoir through said float valve.

2. In the combination of claim 1, further comprising a pocket in the lower end portion of said piston, said rolling body means comprising a ball smaller than said pocket and seatable therein when said engine is vertical, and concave surface means for supporting said ball in said pocket when said engine is vertical, and for moving said ball to beneath the lower edge of said piston when said engine is tilted for holding said piston in valve closed position.

References Cited
UNITED STATES PATENTS

| | | | |
|---|---|---|---|
| 2,283,303 | 5/1942 | Whitlock | 137—39 |
| 3,059,661 | 10/1962 | Benmore | 137—39 |

CLARENCE R. GORDON, *Primary Examiner.*